(12) United States Patent
Yamamoto

(10) Patent No.: US 12,548,181 B2
(45) Date of Patent: Feb. 10, 2026

(54) INFORMATION PROCESSING APPARATUS, SENSING APPARATUS, MOBILE OBJECT, METHOD FOR PROCESSING INFORMATION, AND INFORMATION PROCESSING SYSTEM

(71) Applicant: KYOCERA Corporation, Kyoto (JP)

(72) Inventor: Kenji Yamamoto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 576 days.

(21) Appl. No.: 17/758,003

(22) PCT Filed: Dec. 22, 2020

(86) PCT No.: PCT/JP2020/047909
§ 371 (c)(1),
(2) Date: Jun. 24, 2022

(87) PCT Pub. No.: WO2021/132229
PCT Pub. Date: Jul. 1, 2021

(65) Prior Publication Data
US 2023/0048222 A1    Feb. 16, 2023

(30) Foreign Application Priority Data
Dec. 25, 2019    (JP) .................. 2019-235115

(51) Int. Cl.
*G06T 7/70*    (2017.01)
*G06T 7/50*    (2017.01)
(Continued)

(52) U.S. Cl.
CPC .................. *G06T 7/70* (2017.01); *G06T 7/50* (2017.01); *G06T 7/60* (2013.01); *G06V 10/56* (2022.01);
(Continued)

(58) Field of Classification Search
CPC ............ G06T 7/70; G06T 2207/30252; G06T 2207/20076; G06T 7/60; G06T 7/50;
(Continued)

(56) References Cited

U.S. PATENT DOCUMENTS 5,341,142 A * 8/1994 Reis .................. F41G 7/2293
342/63
7,629,920 B1 * 12/2009 Kuhl .................. G01S 13/64
342/160
(Continued)

FOREIGN PATENT DOCUMENTS

EP        3605489 A1    2/2020
JP    H09-322048 A    12/1997
(Continued)

OTHER PUBLICATIONS

Chow C. K.; "An Optimum Character Recognition System Using Decision Functions", IRE Transactions on Electronic Computers, vol. EC-6, No. 4, Dec. 1957, pp. 247-254, IEEE, XP011275232.
(Continued)

*Primary Examiner* — John Villecco
*Assistant Examiner* — Alexander John Rodgers
(74) *Attorney, Agent, or Firm* — Studebaker Brackett PLLC

(57) ABSTRACT

An information processing apparatus includes an input interface, a processor, and an output interface. The input interface obtains observation data obtained from an observation space. The processor detects a subject image of a detection target from the observation data, calculates a plurality of individual indices indicating degrees of reliability, each of which relates to at least identification information or measurement information regarding the detection target, and also calculates an integrated index, which is obtained by
(Continued)

integrating a plurality of calculated individual indices. The output interface outputs the integrated index.

11 Claims, 15 Drawing Sheets

(51) Int. Cl.

| | | |
|---|---|---|
| *G06T 7/60* | (2017.01) | |
| *G06V 10/56* | (2022.01) | |
| *G06V 10/60* | (2022.01) | |
| *G06V 10/764* | (2022.01) | |
| *G06V 10/80* | (2022.01) | |
| *G06V 20/58* | (2022.01) | |

(52) U.S. Cl.
CPC ............ *G06V 10/60* (2022.01); *G06V 10/764* (2022.01); *G06V 10/80* (2022.01); *G06V 20/58* (2022.01); *G06T 2207/20076* (2013.01); *G06T 2207/30252* (2013.01); *G06V 2201/07* (2022.01)

(58) Field of Classification Search
CPC .. G06V 2201/07; G06V 10/80; G06V 10/764; G06V 10/60; G06V 20/58; G06V 10/56
See application file for complete search history.

(56) References Cited

U.S. PATENT DOCUMENTS

| | | | |
|---|---|---|---|
| 7,710,247 B2 | 5/2010 | Sekiguchi | |
| 7,920,087 B2 * | 4/2011 | Ogawa | .................... G01S 17/89 342/146 |
| 8,896,689 B2 | 11/2014 | Asatani et al. | |
| 2009/0022369 A1 * | 1/2009 | Satoh | ...................... G01B 21/04 382/106 |
| 2011/0001615 A1 | 1/2011 | Kuoch et al. | |
| 2016/0070972 A1 | 3/2016 | Jang | |
| 2017/0210379 A1 * | 7/2017 | Obata | ............. B60W 30/18163 |
| 2017/0270429 A1 * | 9/2017 | Bhattacharya | ......... G06N 20/10 |
| 2017/0343665 A1 * | 11/2017 | Willey | ................... G01S 13/931 |
| 2019/0128677 A1 * | 5/2019 | Naman | .................... G06T 7/593 |
| 2019/0354757 A1 * | 11/2019 | Saptharishi | .......... H04N 23/611 |
| 2020/0041285 A1 * | 2/2020 | Kato | .................... G09B 29/007 |
| 2020/0049811 A1 * | 2/2020 | Bialer | .................. G01S 13/589 |
| 2020/0249032 A1 * | 8/2020 | Lee | ...................... G09B 29/006 |
| 2020/0285242 A1 * | 9/2020 | Gu | .......................... G06N 5/048 |
| 2021/0150279 A1 * | 5/2021 | Dudzik | ................. G01S 17/931 |
| 2021/0263525 A1 * | 8/2021 | Das | ........................ G06N 3/084 |
| 2021/0270721 A1 * | 9/2021 | D'Apuzzo | ......... G01N 15/0227 |
| 2021/0312248 A1 * | 10/2021 | Tchuiev | ............. G06F 18/2415 |
| 2023/0048222 A1 * | 2/2023 | Yamamoto | ............. G06V 10/56 |

FOREIGN PATENT DOCUMENTS

| | | |
|---|---|---|
| JP | 2007-310741 A | 11/2007 |
| JP | 2013-120083 A | 6/2013 |
| WO | 2018/198239 A1 | 11/2018 |

OTHER PUBLICATIONS

Chow C. K.; "On Optimum Recognition Error and Reject Tradeoff", IEEE Transactions on Information Theory, vol. 16, No. 1, Jan. 1970, pp. 41-46, IEEE, XP008073178.

Vojtech Franc et al.; "Optimal Strategies for Reject Option Classifiers", Journal of Machine Learning Research, arxiv.org, Cornell University Library, Ithaca, NY, Jan. 29, 2021, pp. 1-48, XP081870577.

* cited by examiner

INFORMATION PROCESSING APPARATUS, SENSING APPARATUS, MOBILE OBJECT, METHOD FOR PROCESSING INFORMATION, AND INFORMATION PROCESSING SYSTEM

CROSS REFERENCES TO RELATED APPLICATIONS

The present application claims priority of Japanese Patent Application No. 2019-235115, filed Dec. 25, 2019. The contents of this prior application are incorporated herein by reference in their entirety.

TECHNICAL FIELD

The present disclosure relates to an information processing apparatus, a sensing apparatus, a mobile object, a method for processing information, and an information processing system.

BACKGROUND ART

Apparatuses that detect, on the basis of outputs of sensors mounted on a vehicle, such as a vehicle camera, types, positions, sizes, and the like of objects to be detected have been conventionally provided. Such apparatuses might cause erroneous detection and detection errors depending on sensor performance and a surrounding environment. An apparatus or a system capable of outputting a degree of reliability of a detection result while measuring a detection target has therefore been proposed (e.g., refer to PTL 1).

PTL 1, for example, discloses a camera system that recognizes, from an image obtained by a camera, a subject whose image is to be captured and that sequentially measures a three-dimensional position of the subject while creating measurement information along with information that serves as an index of a degree of reliability of the measurement information.

CITATION LIST

Patent Literature

PTL 1: Japanese Unexamined Patent Application Publication No. 9-322048

SUMMARY OF INVENTION

An information processing apparatus in the present disclosure includes an input interface, a processor, and an output interface. The input interface that obtains observation data obtained from an observation space. The processor detects a detection target from the observation data, calculates a plurality of individual indices indicating degrees of reliability, each of which relates to at least identification information or measurement information regarding the detection target, and also calculates an integrated index, which is obtained by integrating the plurality of calculated individual indices together. The output interface that outputs the integrated index.

A sensing apparatus in the present disclosure includes a sensor, a processor, and an output interface. The sensor is configured to sense an observation space and obtain observation data regarding a detection target. The processor detects a detection target from the observation data, calculates a plurality of individual indices indicating degrees of reliability, each of which relates to at least identification information or measurement information regarding the detection target, an also calculates an integrated index, which is obtained by integrating the plurality of calculated individual indices together. The output interface that outputs the integrated index.

A mobile object in the present disclosure includes an information processing apparatus. The information processing apparatus includes an input interface, a processor, and an output interface. The input interface obtains observation data obtained from an observation space. The processor detects a detection target from the observation data, calculates a plurality of individual indices indicating degrees of reliability, each of which relates to at least identification information or measurement information regarding the detection target, and also calculates an integrated index, which is obtained by integrating the plurality of calculated individual indices together. The output interface outputs the integrated index.

A method for processing information in the present disclosure includes obtaining observation data from an observation space, detecting a detection target from the observation data, and calculating a plurality of individual indices indicating degrees of reliability, each of which relates to at least identification information or measurement information regarding the detection target. The method for processing information includes also calculating an integrated index, which is obtained by integrating the plurality of calculated individual indices together and outputting the integrated index.

An information processing system in the present disclosure includes a sensor, an information processing apparatus, and a determination apparatus. The sensor obtains observation data from an observation space. The information processing apparatus includes a processor. The processor detects a detection target from the observation data, and calculates a plurality of individual indices indicating degrees of reliability, each of which relates to at least identification information or measurement information regarding the detection target. The processor also calculates an integrated index, which is obtained by integrating the plurality of calculated individual indices together. The determination apparatus determines, on a basis of the integrated index, whether at least the identification information or the measurement information based on the sensor is available.

DESCRIPTION OF EMBODIMENTS

Figure 1:
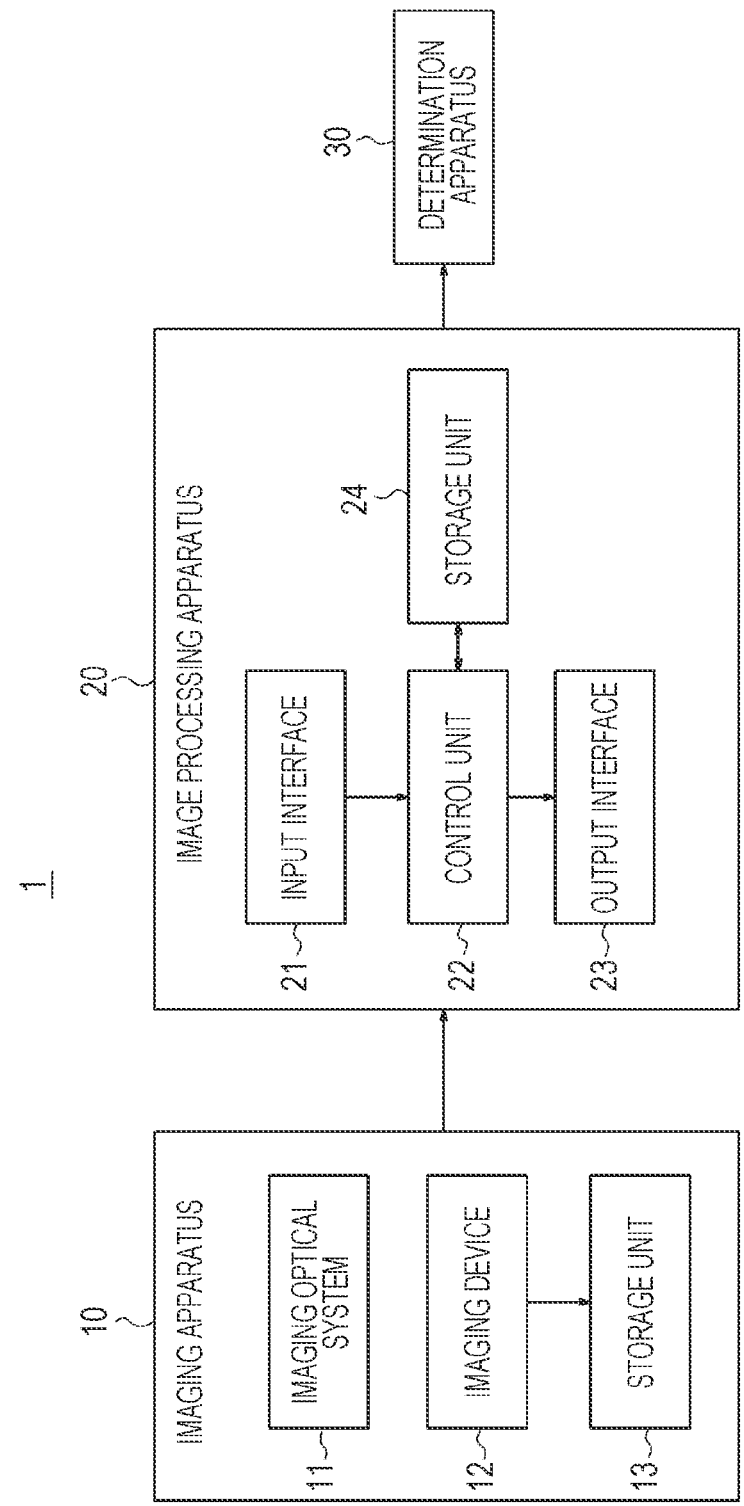
FIG. 1 is a block diagram illustrating a schematic configuration of an image processing system, which is an information processing system according to an embodiment.

An information processing apparatus that processes observation data obtained by a sensing apparatus such as a vehicle camera might detect multiple targets of multiple types. In addition, information detected by the information processing apparatus can include quantitative measurement information and identification information such as classifications of detection targets. In such cases, creation of information regarding a degree of reliability for each piece of information regarding each target might be extremely cumbersome.

It might be convenient if a plurality of pieces of information regarding degrees of reliability can be integrated together and one index of a degree of reliability can be calculated.

An embodiment of the present disclosure will be described hereinafter with reference to the drawings. The drawings used in the following description are schematic diagrams. Dimensions, proportions, and the like in the drawings do not necessarily match those of reality.

Figure 2:
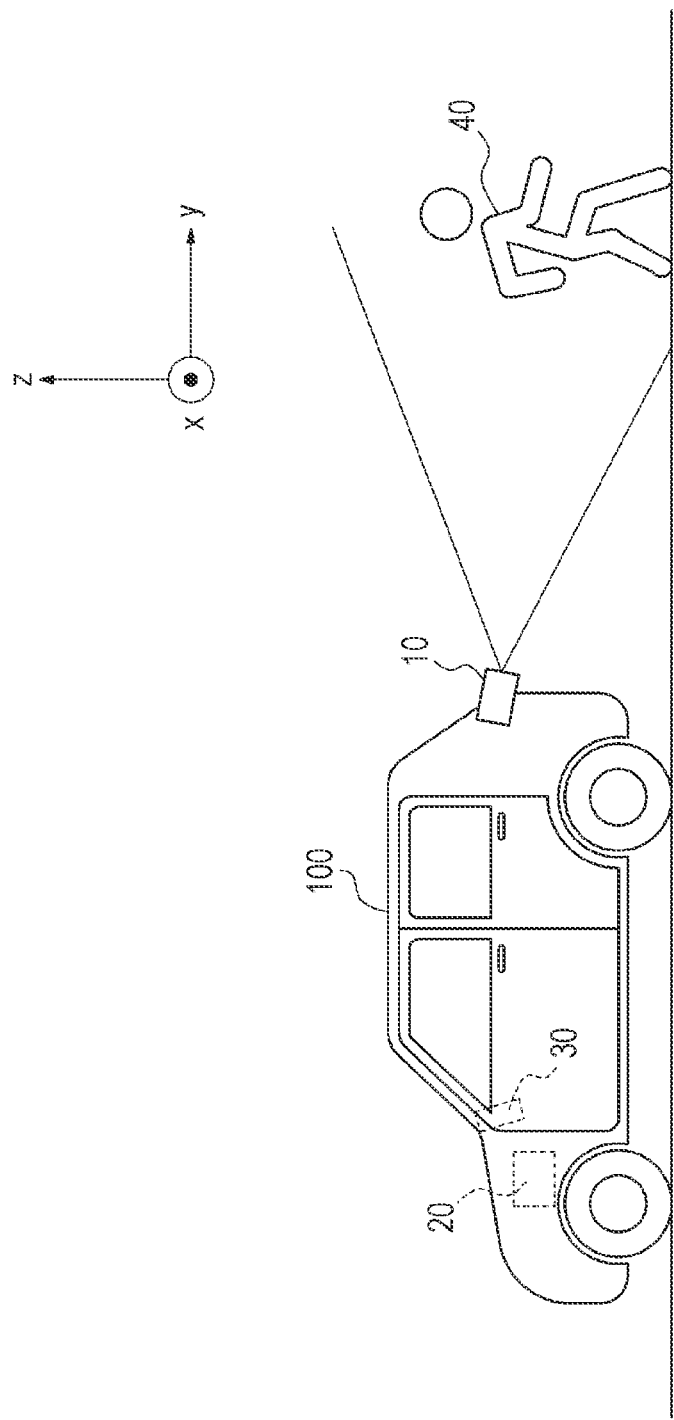
FIG. 2 is a diagram illustrating an example of a vehicle on which the image processing system illustrated in FIG. 1 is mounted and a subject.

An image processing system 1, which is an example of an information processing system according to the embodiment of the present disclosure, includes an imaging apparatus 10, an image processing apparatus 20, and a determination apparatus 30. The imaging apparatus 10 is an example of a sensor that senses an observation space. The image processing apparatus 20 is an example of an information processing apparatus. As illustrated in FIG. 2, the image processing system 1 is mounted on a vehicle 100, which is an example of a mobile object.

As illustrated in FIG. 2, in the present embodiment, an x-axis direction in real space coordinates is a width direction of the vehicle 100 provided with the imaging apparatus 10. Real space is an observation space from which observation data is to be obtained. A y-axis direction is a direction in which the vehicle 100 backs up. The x-axis direction and the y-axis direction are directions parallel to a road surface on which the vehicle 100 is located. A z-axis direction is a direction perpendicular to the road surface. The z-axis direction can also be referred to as a vertical direction. The x-axis direction, the y-axis direction, and the z-axis direction are perpendicular to one another. The x-axis direction, the y-axis direction, and the z-axis direction need not be defined in this manner. The x-axis direction, the y-axis direction, and the z-axis direction are interchangeable.

(Imaging Apparatus)

As illustrated in FIG. 1, the imaging apparatus 10 includes an imaging optical system 11, an imaging device 12, and a control unit 13.

The imaging apparatus 10 can be mounted on the vehicle 100 at one of various positions. The imaging apparatus 10 may be a front camera, a left-side camera, a right-side camera, a rear camera, or the like, but is not limited to these. The front camera, the left-side camera, the right-side camera, and the rear camera are mounted on the vehicle 100 in such a way as to be able to capture images of scenes ahead of, to the left of, to the right of, and behind the vehicle 100, respectively. In the embodiment that will be described hereinafter as an example, the imaging apparatus 10 is mounted on the vehicle 100 with an optical axis direction thereof pointing downward as illustrated in FIG. 2 so that an image of a scene behind the vehicle 100 can be captured.

The imaging device 12 may be a CCD image sensor (charge-coupled device image sensor), a CMOS image sensor (complementary MOS image sensor), or the like. The imaging device 12 converts a subject image formed by the imaging optical system 11 on an imaging surface of the imaging device 12 into an electrical signal. A subject image is an image of a subject to be detected. The imaging device 12 can capture a moving image with a certain frame rate. A moving image is an example of observation data. Still images constituting a moving image are called frames. The number of images that can be captured per second is called a frame rate. The frame rate may be, for example, 60 fps (frames per second), 30 fps, or the like.

The control unit 13 controls the entirety of the imaging apparatus 10 and performs various types of image processing on moving images output from the imaging device 12. The image processing performed by the control unit 13 can include any type of processing such as distortion correction, brightness adjustment, contrast adjustment, or gamma correction.

The control unit 13 may be achieved by one or a plurality of processors. The control unit 13 includes, for example, one or more circuits or units configured to perform one or more data calculation procedures or processes by executing instructions stored in a related memory. The control unit 13 may be one or more processors, microprocessors, microcontrollers, application-specific integrated circuits (ASICs), digital signal processors (DSPs), programmable logic devices (PLDs), field-programmable gate arrays (FPGAs), any combination of these devices or components, or a combination of other known devices or components.

(Image Processing Apparatus)

The image processing apparatus 20 can be mounted on the vehicle 100 at any position. For example, the image processing apparatus 20 can be provided, for example, in a dashboard, in a trunk compartment, or under a seat of the vehicle 100. The image processing apparatus 20 includes an input interface 21, a control unit 22, an output interface 23, and a storage unit 24.

The input interface 21 is configured to be communicable with the imaging apparatus 10 through wired or wireless communication means. The input interface 21 is configured to be able to obtain moving images from the imaging apparatus 10. The input interface 21 may employ a transmission method used for image signals transmitted by the imaging apparatus 10. The input interface 21 can also be referred to as an input unit or an obtaining unit. The imaging apparatus 10 and the input interface 21 may be connected to each other by a vehicle communication network such as a CAN (control area network).

The control unit 22 controls the entirety of the image processing apparatus 20. The control unit 22 detects a subject image from a moving image obtained through the input interface 21 and calculates a plurality of individual indices indicating degrees of reliability, each of which relates to at least identification information or measurement information regarding the subject image. The control unit 22 also calculates an integrated index, which is obtained by integrating the plurality of calculated individual indices together. As with the control unit 13 of the imaging apparatus 10, the control unit 22 includes one or a plurality of processors. In addition, as with the control unit 13, the control unit 22 may be achieved by combining devices of a plurality of types together. The control unit 22 can also be referred to as a processor or a controller.

In the present embodiment, "identification information" is information indicating features of a subject 40 detected from a moving image. "Identification information" includes a "type", a "color", "luminance", and the like of a subject 40 detected from a moving image. Here, a "type" of subject 40 is obtained in accordance with a classification of an object that is a subject 40. A type of subject 40 can also be referred to as a "class" of a subject. "Identification information" is identified as one of a plurality of classifications. Classifications of a "type" of subject 40 include, for example, "vehicle", "pedestrian", "two-wheeled vehicle", and the like. When a subject 40 is an object on a road, the control unit 22 identifies a "type" of subject 40 as one of a plurality of classifications of "type". Classifications of a "color" of a subject 40 include, for example, "red", "green", "yellow", and the like. When a subject 40 is a traffic light on a roadside, the control unit 22 can identify "red", "green", or "yellow" as a classification of the color of the subject 40. "Luminance" of a subject 40 has a plurality of classifications, such as "bright" and "dark", by providing thresholds in accordance with luminance detected by the imaging device 12.

In the present embodiment, "measurement information" is quantitative information obtained by sequentially processing images of a subject 40 included in a moving image and performing calculation. "Measurement information" includes, for example, a "position", a "distance", a "size", and the like of a subject 40 detected from a moving image. A "position" indicates, for example, coordinates of a subject 40 in real space. A "distance" is, for example, a distance from the vehicle 100, especially the imaging apparatus 10, to a subject 40. A "size" is dimensions, such as width and height, of a subject 40 in real space.

In the present embodiment, "degrees of reliability" are probabilities of identification information and measurement information calculated by the control unit 22. A "degree of reliability" is a relative concept. A "degree of reliability" in the present disclosure may be represented by an index indicating a degree of reliability as a value of 0 to 1. For example, the lower the index of a degree of reliability, the lower the degree of reliability. For example, the higher the index of a degree of reliability, the higher the degree of reliability.

Figure 3:
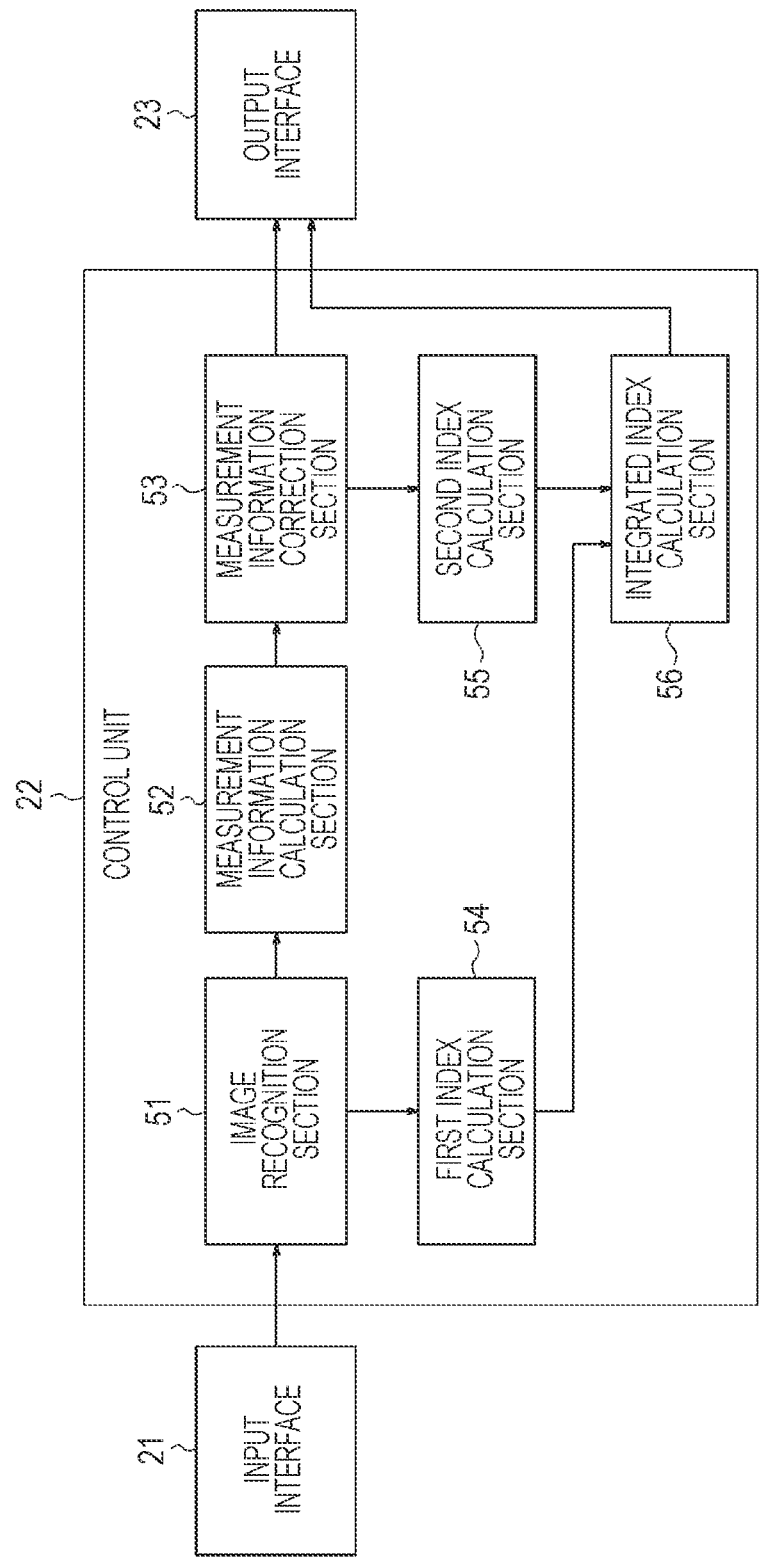
FIG. 3 is a functional block diagram of a control unit of an image processing apparatus illustrated in FIG. 1.

As illustrated in FIG. 3, the control unit 22 includes functional blocks of an image recognition section 51, a measurement information calculation section 52, a measurement information correction section 53, a first index calculation section 54, a second index calculation section 55, and an integrated index calculation section 56. Details of processing performed by the functional blocks will be described later.

The output interface 23 is configured to output an output signal, which is output information, from the image processing apparatus 20. The output interface 23 can also be referred to as an output unit. The output interface 23 can output identification information and measurement information calculated by the control unit 22 and an integrated index indicating a degree of reliability of these pieces of information to the outside of the image processing apparatus 20. The output interface 23 can output, for example, the identification information, the measurement information, and the integrated index to the determination apparatus 30 outside the image processing apparatus 20. The determination apparatus 30 may be included in a collision avoidance device, a warning device, or the like.

The output interface 23 includes a physical connector and/or a wireless transmitter. In one of a plurality of embodiments, the output interface 23 can be connected to a network of the vehicle 100, such as a CAN. The output interface 23 can be connected to the determination apparatus 30, the collision avoidance device and a vehicle distance warning device of the vehicle 100, and the like over the communication network such as a CAN.

The storage unit 24 is a storage device storing data and programs necessary for processing performed by the control unit 22. For example, the storage unit 24 temporarily stores a moving image obtained from the imaging apparatus 10. For example, the storage unit 24 sequentially stores data generated as a result of processing performed by the control unit 22. The storage unit 24 may be achieved, for example, using a semiconductor memory, a magnetic memory, an optical memory, and/or the like. A semiconductor memory may be a volatile memory or a nonvolatile memory. A magnetic memory may be, for example, a hard disk, a magnetic tape, or the like. An optical memory may be, for example, a CD (compact disc), a DVD (digital versatile disc), a BD (Blu-ray (registered trademark) disc), or the like.

The determination apparatus 30 determines, on the basis of an integrated index output from the image processing apparatus 20, whether at least identification information or measurement information regarding each subject 40 is available. The determination apparatus 30 may be incorporated into another apparatus that uses identification information and measurement information. An apparatus including the determination apparatus 30 may be an apparatus that provides a function of collision warning, automatic braking, automatic steering, or the like. For example, the determination apparatus 30 assumes a case where the image processing apparatus 20 has detected a subject 40 of a certain type in a traveling direction of the vehicle 100 along with a distance to the subject 40. If a value of an integrated index is close to 0, that is, if a degree of reliability is extremely low, the determination apparatus 30 need not use information regarding the subject 40 output from the image processing apparatus 20. If a value of an integrated index is close to 1, that is, if a degree of reliability is high, the determination apparatus 30 may use information regarding the subject 40 output from the image processing apparatus 20 to, for example, control the vehicle or the like.

(Functions of Control Unit)

The functional blocks of the control unit 22 will be described hereinafter with reference to FIGS. 3 to 9. The functional blocks of the control unit 22 may be hardware modules or software modules. The control unit 22 can perform operations performed by the individual functional blocks that will be described hereinafter. The control unit 22 may perform all the operations of each of the functional blocks. The operations performed by each of the functional blocks may also be referred to as operations performed by the control unit 22. Processing performed by the control unit 22 using one of the functional blocks may be regarded as being performed by the control unit 22.

(Image Recognition Section)

Figure 4:
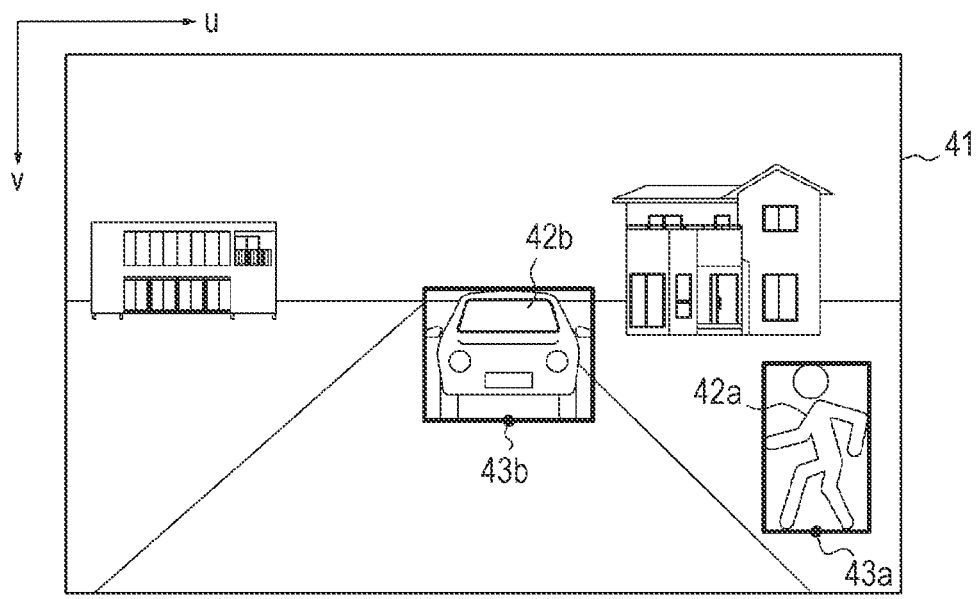
FIG. 4 is a diagram illustrating an example of a subject image in a moving image.

The image recognition section 51 obtains each of frames of a moving image from the imaging apparatus 10 through the input interface 21. FIG. 4 illustrates an example of an image of a frame of a moving image. In the example illustrated in FIG. 4, a subject image 42a of a pedestrian crossing behind the vehicle 100 and a subject image 42b of another vehicle running behind the vehicle 100 are displayed in a two-dimensional image space 41 defined by a u-v coordinate system. An image space is an example of a display space. A display space is a space where a detection target is represented in two dimensions in order to allow a user to recognize the detection target or another apparatus to use the detection target. A u-coordinate is a coordinate in a horizontal direction of the image. A v-coordinate is a coordinate in a vertical direction of the image. In FIG. 4, an origin of the u-v coordinates is a point on an upper-left corner of the image space 41. A positive direction of the u-coordinate is a rightward direction. A positive direction of the v-coordinate is a downward direction.

The image recognition section 51 detects the subject images 42a and 42b from each of the frames of the moving image (hereinafter collectively referred to as subject images 42 as necessary). A method for detecting the subject images 42 may be one of various known methods. For example, the method for recognizing the subject images 42 may be a method based on recognition of shapes of objects such as vehicles and pedestrians, a method based on template matching, a method in which feature values are calculated from an image and used for matching, or the like. In the method for detecting the subject images 42 in which feature values are calculated, a function approximator capable of learning input-output relationships may be used. The function approximator capable of learning input-output relationships may be a neural network. For example, the image recognition section 51 can calculate feature values using a function approximator that has learned in advance feature values of each of types of subject 40, such as a vehicle, a pedestrian, or a two-wheeled vehicle, through deep learning based on a neural network.

The image recognition section 51 outputs information regarding a type of subject 40 as an example of identification information. The image recognition section 51 calculates classifications of a type of subject 40 and a belonging probability of each of the classifications for each of detected subject images 42. The belonging probability indicates a probability of belonging to the classification. When classifications of a type of subject image 42a are "vehicle", "pedestrian", and "two-wheeled vehicle", for example, the image recognition section 51 calculates belonging probabilities of, say, 0.7, 0.2, and 0.1 for "vehicle", "pedestrian", and "two-wheeled vehicle", respectively. In this case, the number of classifications is three. The image recognition section 51 determines "pedestrian", whose belonging probability is the highest, as a classification of the type of subject image 42a.

The image recognition section 51 can output information indicating a position, a size, and the like of each of subject images 42 detected for each frame in the image space 41. For example, the image recognition section 51 can identify ranges in the image space 41 occupied by each of the subject images 42 in the horizontal direction (u direction) and the vertical direction (v direction) and determine the ranges as a size of the subject image 42. For example, the ranges in the image space 41 occupied by each of the subject image 42 are indicated by a rectangular frame in FIG. 4. The image recognition section 51 also identifies a position of each of the subject images 42 in the image space 41. For example, the image recognition section 51 identifies points at centers of bottoms of ranges in the image space 41 occupied by the subject images 42a and 42b as representative points 43a and 43b (hereinafter collectively referred to as representative points 43 as necessary) indicating positions of the subject images 42a and 42b, respectively. The representative points 43 are assumed to be at positions at which subjects 40 corresponding to the subject images 42 are in contact with a road surface or the ground.

The image recognition section 51 can output detected identification information to the outside of the image processing apparatus 20 through the output interface 23. The image recognition section 51 gives identification information regarding each subject 40 and a belonging probability of each of classifications of the identification information to the first index calculation section 54. The image recognition section 51 gives information regarding a position and a size of a subject image 42 in the image space 41 to the measurement information calculation section 52.

(Measurement Information Calculation Section)

The measurement information calculation section 52 calculates measurement information on the basis of a position and a size of a subject image 42 in the image space 41 detected by the image recognition section 51. For example, the measurement information calculation section 52 calculates a position of a subject 40 by mapping a position of a representative point 43 identified by the image recognition section 51 to real space.

Figure 5:
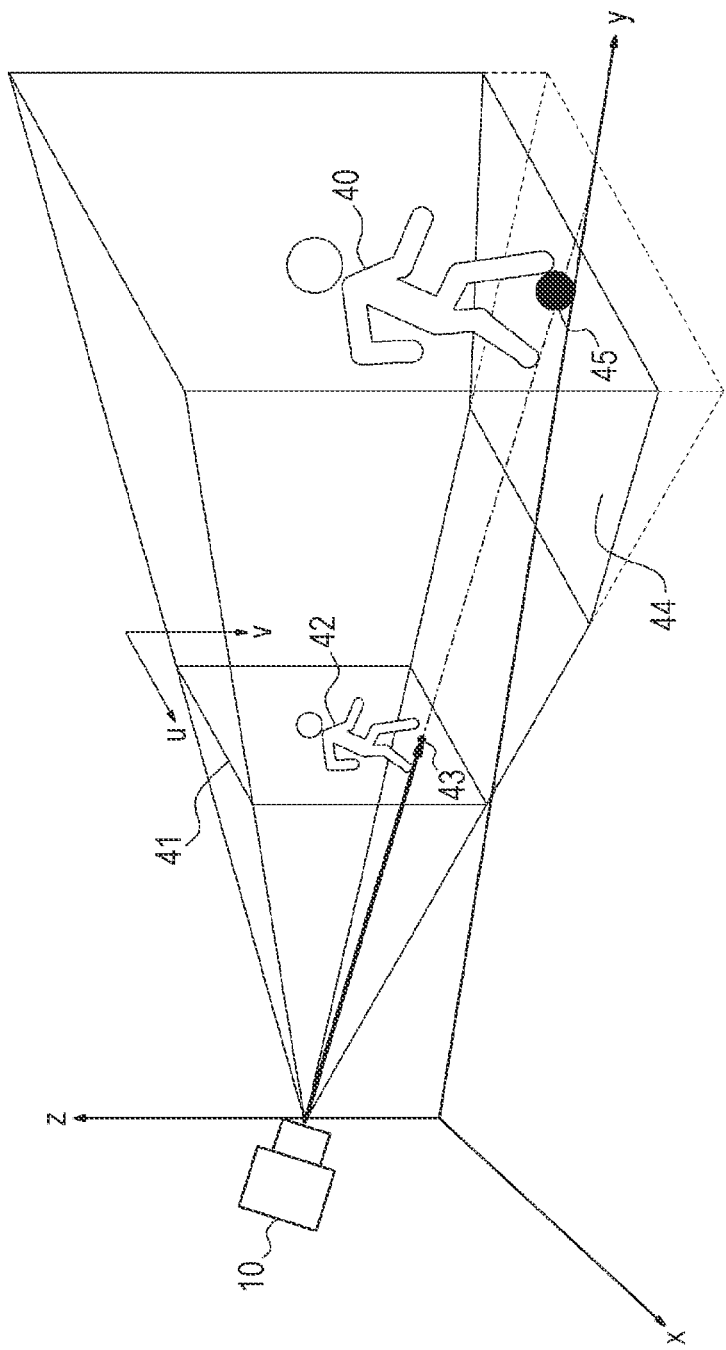
FIG. 5 is a diagram illustrating a relationship between a subject in real space, the subject image in the moving image, and a material point in a virtual space.

For example, FIG. 5 illustrates a relationship between a subject 40 in three-dimensional real space and a subject image 42 in a two-dimensional image space 41. When internal parameters of the imaging apparatus 10 are known, a direction from a center of the imaging optical system 11 of the imaging apparatus 10 to coordinates (x, y, z) in real space corresponding to coordinates (u, v) in the image space 41 can be calculated on the basis of the coordinates (u, v). The internal parameters of the imaging apparatus 10 include information such as a focal distance and distortion of the imaging optical system 11 and a pixel size of the imaging device 12. In real space, a point at which a straight line toward a direction corresponding to the representative point 43 in the image space 41 intersects with a reference plane 44, where z=0, is defined as a material point 45 of the subject 40. The reference plane 44 corresponds to a road surface or the ground on which the vehicle 100 is located. The material point 45 has three-dimensional coordinates (x, y, 0). When a two-dimensional plane whose z=0 is used as a virtual space 46, therefore, coordinates of the material point 45 can be represented as (x', y'). A virtual space is used by the control unit 22 to describe motion of objects. The coordinates (x', y') of the material point 45 in the virtual space 46 correspond to coordinates (x, y) of a certain point on the subject 40 in an x-y plane (z=0) when the subject 40 is viewed in real space in a direction along a z-axis. The certain point corresponds to the material point 45.

A method for detecting a position of a subject 40 using a subject image 42 is not limited to a method employing mapping such as that illustrated in FIG. 5. For example, the measurement information calculation section 52 can detect a three-dimensional position of a subject 40 by preparing a stereo camera using a plurality of imaging apparatuses 10. In this case, the measurement information calculation section 52 can calculate a distance from the plurality of imaging apparatuses 10 to each of pixels of a subject image 42 on the basis of disparity between images obtained from the imaging apparatuses 10, which are arranged with optical axes thereof being set parallel to one another. In this case, moving images obtained from the plurality of imaging apparatuses 10 are included in observation data.

The measurement information calculation section 52 may also obtain a distance to the subject 40 from a distance measuring apparatus capable of measuring distance, which is mounted on the vehicle 100, integrate the distance with information regarding the subject image 42 detected by the image recognition section 51, and calculate a position of the subject 40 in real space. The distance measuring apparatus may be a LIDAR (light detection and ranging), a millimeter-wave radar, a laser radar, an ultrasonic sensor, a stereo camera, or the like. The distance measuring apparatus is not limited to these, and one of various apparatuses capable of measuring distance may be used. In this case, the observation data includes data regarding the distance to the subject 40 obtained from the distance measuring apparatus along with a moving image obtained from the imaging apparatus 10.

The measurement information calculation section 52 can calculate a size of a subject 40 in real space on the basis of a size of a subject image 42 in an image space 41 and information regarding a distance to the subject 40.

(Measurement Information Calculation Section)

Figure 6:
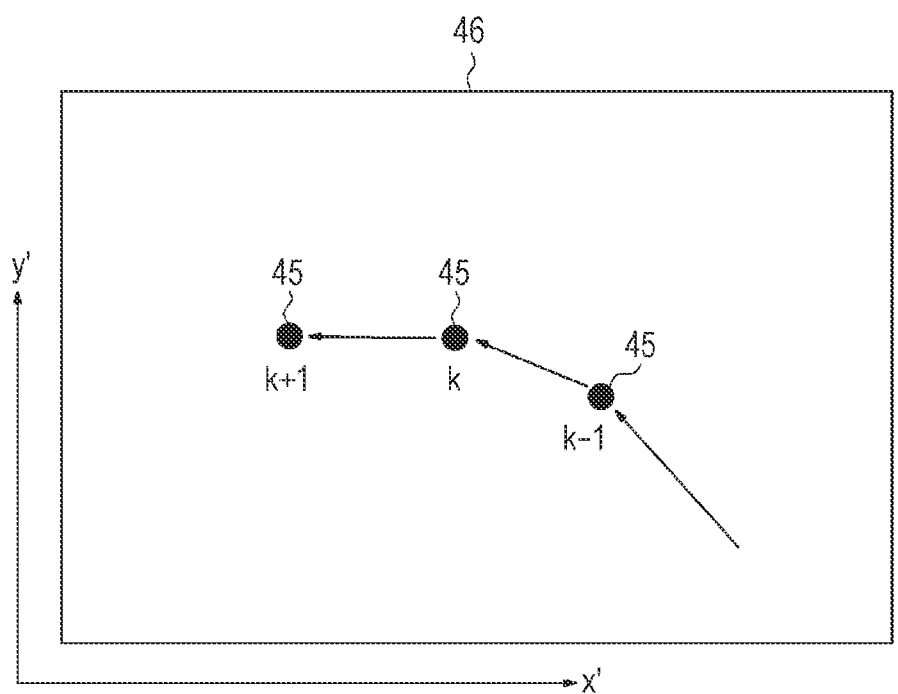
FIG. 6 is a diagram illustrating an example of movement of the material point in the virtual space.

When subject images 42 overlap each other in an image space 41, the image recognition section 51 might not be able to perform correct detection. In addition, the detection of measurement information performed by the measurement information calculation section 52 can include errors due to various factors such as accuracy of the imaging apparatus 10, vibration during imaging, and ambient brightness. The measurement information correction section 53, therefore, estimates correct measurement information and corrects the measurement information on the basis of measurement information regarding a subject 40 obtained from images of sequential frames. A case where the measurement information calculation section 52 calculates coordinates (x', y') of a material point 45 in a virtual space 46 as a position of a subject 40 will be described. As illustrated in FIG. 6, the measurement information correction section 53 tracks, in the virtual space 46, the position (x', y') and a velocity ($v_x'$, $v_y'$) of the material point 45, which is obtained by mapping a representative point 43 of a subject image 42 to the virtual space 46. It is assumed that k−1, k, and k+1 in FIG. 6 denote frame numbers to which the material point 45 corresponds. Since the material point 45 includes information regarding the position (x', y') and the velocity ($v_x'$, $v_y'$), the control unit 22 can predict ranges of the position (x', y') of the material point 45 in subsequent frames. The control unit 22 can recognize a material point 45 located within a range predicted for a next frame as the material point 45 corresponding to the subject image 42 that is being tracked. Each time the control unit 22 receives a new frame, the control unit 22 sequentially updates the position (x', y') and the velocity ($v_x'$, $v_y'$) of the material point 45.

Estimation using a Kalman filter based on a state space model, for example, can be employed for the tracking of the material point 45. By performing prediction/estimation using the Kalman filter, robustness against no detection, erroneous detection, and the like of the subject 40 to be tracked improve. In general, it is difficult to describe the subject image 42 in the image space 41 with an appropriate model for describing motion. It has therefore been difficult to estimate the subject image 42 in the image space 41 easily and accurately. Because a model for describing motion in real space can be applied with the image processing apparatus 20 according to the present embodiment by mapping the subject image 42 as the material point 45 in a virtual space corresponding to an x-y plane in real space, accuracy of tracking the subject 40 improves. In addition, by handling the subject 40 as the material point 45 without volume, simple and easy tracking can be achieved.

Each time a frame of a moving image is obtained from the imaging apparatus 10, the measurement information correction section 53 estimates a correct position of the subject 40 at that time point. The measurement information correction section 53 may assume a normal distribution in the estimation of the position of the subject 40. The measurement information correction section 53 calculates estimated values of a position of the subject 40 and calculates an error covariance matrix. The measurement information correction section 53 can specify a probability density distribution of the position of the subject 40 in the virtual space 46 using the error covariance matrix. With the error covariance matrix, a range of error can be represented by an error ellipse, and probabilities of an estimated range defined by the image processing apparatus 20 in specifications can be evaluated. An error ellipse is an ellipse indicating a statistically determined range within which a true value is located with a certain probability.

Figure 7:
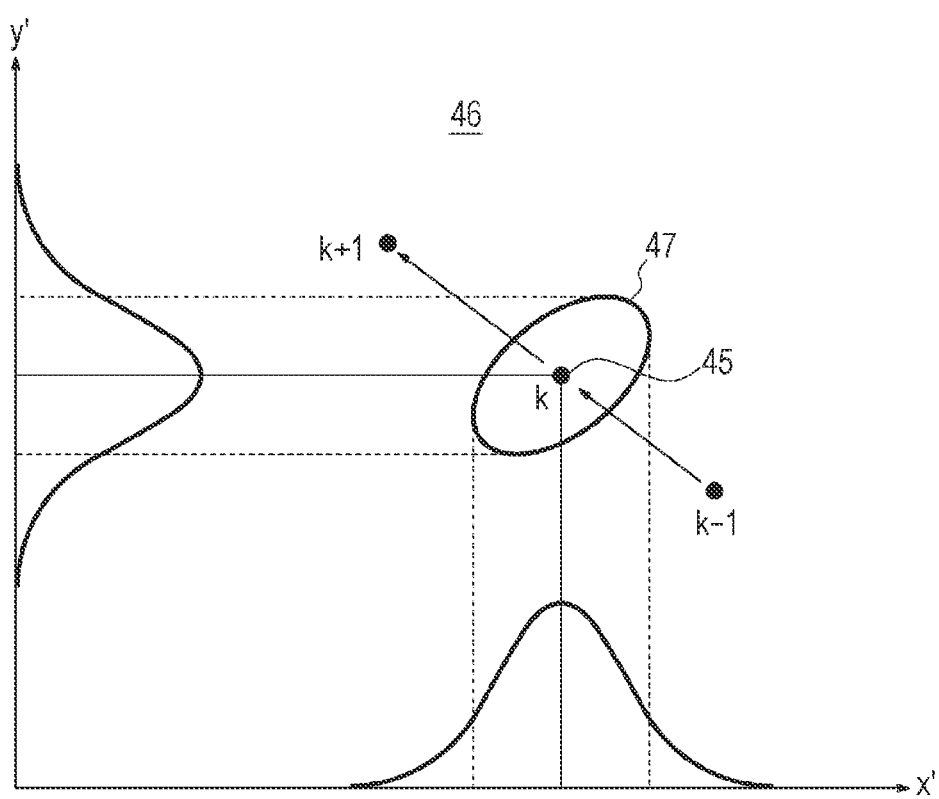
FIG. 7 is a diagram illustrating an error ellipse of estimated values of a position of a subject.

As illustrated in FIG. 7, an error ellipse 47 can be displayed as an elliptical area around the material point 45 of the subject 40 in the virtual space 46. In terms of x'-axis and y'-axis directions, probability density distributions of the material point 45 are one-dimensional normal distributions. FIG. 7 illustrates the probability density distributions in the x'-axis direction and the y'-axis direction as curves along an x'-axis and a y'-axis, respectively. Two eigenvalues $\lambda_1$ and $\lambda_2$ of the error covariance matrix correspond to lengths of major and minor axes of the error ellipse. $\lambda_1 \lambda_2 \pi$ is the area of the error ellipse.

Each time measurement information is obtained from an image of each frame, the measurement information correction section 53 corrects measurement information calculated by the measurement information calculation section 52 on the basis of estimated values of the position of the material point 45 and the like. The measurement information correction section 53 outputs the corrected measurement information through the output interface 23. The measurement information correction section 53 calculates an error covariance matrix or eigenvalues thereof and gives the error covariance matrix or the eigenvalues to the second index calculation section 55.

(First Index Calculation Section)

The first index calculation section 54 calculates a first index relating to identification information on the basis of a belonging probability of each of classifications of the identification information calculated by the image recognition section 51. The first index is also called an object identification index. The first index is an individual index. The first index calculation section 54 calculates a first index relating to identification information using:

[Math. 1]

$$\frac{\|v_p\|_2 - 1/\sqrt{N}}{1 - 1/\sqrt{N}} \quad (1)$$

where a vector whose element is the belonging probability of each of the classifications of the identification information is a belonging probability vector $v_p$ and the number of classifications is N. Here,

[Math. 2]
$$\|v_p\|_2$$

denotes an L2 norm of the belonging probability vector $v_p$. The L2 norm is also called a Euclidean norm.

The first index takes a value of 0 to 1. The first index becomes high when a belonging probability of a certain classification is close to 1. The first index becomes low when there are little differences between belonging probabilities of the classifications. Expression (1) at a time when the number of classifications is two and probabilities are denoted by $p_1$ and $p_2$, for example, can be expressed as follows. The sum of $p_1$ and $p_2$ is always 1.

[Math. 3]
$$\frac{\sqrt{p_1^2 + p_2^2} - 1/\sqrt{2}}{1 - 1/\sqrt{2}} \quad (2)$$

Figure 8:
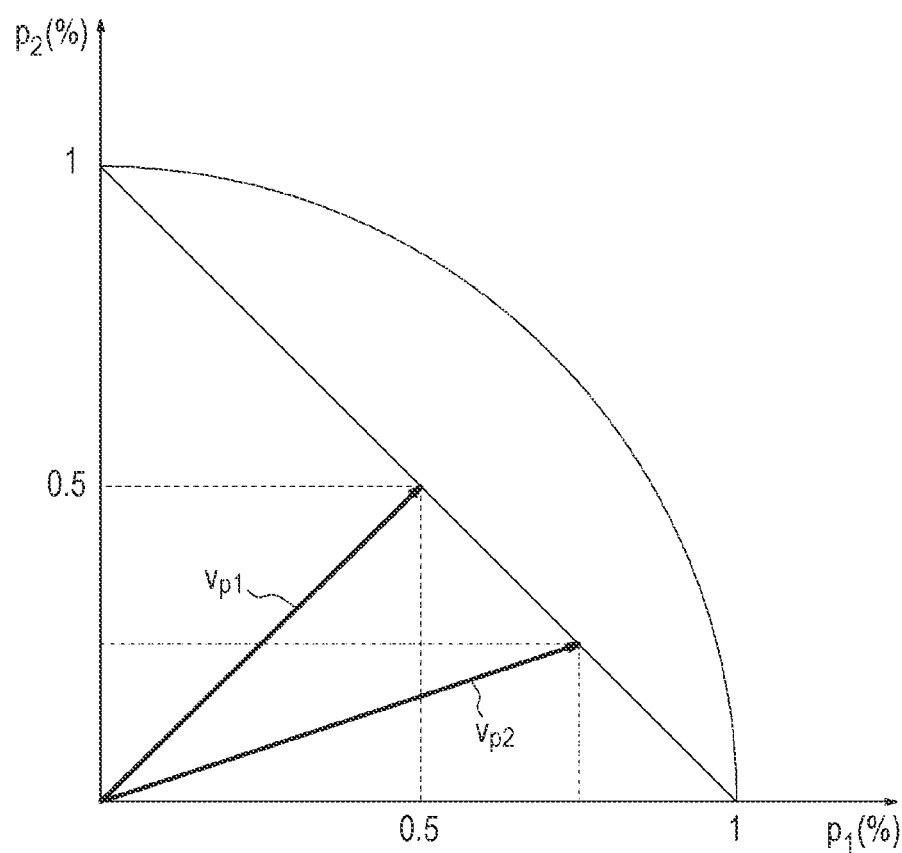
FIG. 8 is a diagram illustrating a method for calculating a first index.

FIG. 8 illustrates $v_{p1}$ and $v_{p2}$, which are examples of the belonging probability vector $v_p$ in a coordinate system whose axes are $p_1$ and $p_2$. An end of the belonging probability vector $v_p$ is on a straight line connecting a point (1, 0) and a point (0, 1) to each other. Expression (2) becomes the smallest value, 0, when a combination ($p_1$, $p_2$) of belonging probabilities of two classifications is (0.5, 0.5). Expression (2) becomes closer to 1 when the combination ($p_1$, $p_2$) of belonging probabilities of two classifications is closer to (1, 0) or (0, 1). A value of expression (2) close to 1 indicates that the image recognition section 51 has clearly determined a classification of identification information.

A similar determination can also be made when N is 3 or more. When classifications of a type of subject 40 are a vehicle, a pedestrian, and a two-wheeled vehicle and a belonging probability vector $v_p$ thereof is $v_p$=(0.9, 0.1, 0.0) or $v_p$=(0.6, 0.2, 0.2), for example, a first index in a former case is 0.77650 and a first index in a latter case is 0.20341. In both of these cases, the image recognition section 51 determines that the subject 40 is a vehicle, but the first index indicates that a degree of reliability of the former case is higher than that of the latter case.

The first index calculation section 54 outputs a first index to the integrated index calculation section 56. The first index is not limited to an index of a degree of reliability regarding a type of subject 40. The first index may include, for example, indices of color, luminance, and the like. The number of first indices is not limited to one, and may be two or more.

(Second Index Calculation Section)

The second index calculation section 55 calculates a second index on the basis of eigenvalues of an error covariance matrix calculated by the measurement information correction section 53. The second index is an individual index. Eigenvalues of an error covariance matrix may be used to evaluate probabilities of estimated ranges of measurement information regarding a subject 40. The second index calculation section 55 calculates the second index on the basis of the probabilities of the estimated ranges of a position of the subject 40.

In general, an estimated error of a position of an object on a two-dimensional plane is assumed to follow a chi-square distribution with two degrees of freedom used in statistics. It is known that a probability density function (PDF) in the chi-square distribution with two degrees of freedom is expression (3).

[Math. 4]
$$f(x) = \frac{1}{2} e^{-\frac{x}{2}} \quad (3)$$

In addition, it is generally known that a cumulative distribution function (CDF) in the chi-square distribution with two degrees of freedom is expression (4).

[Math. 5]
$$F(x) = 1 - e^{-\frac{x}{2}} \quad (4)$$

When the eigenvalues of the error covariance matrix are denoted by $\lambda_1$ and $\lambda_2$ and unilateral tolerance margins in an x direction and a y direction allowable as error ranges of the image processing apparatus 20 are denoted by $d_1$ and $d_2$, the second index calculation section 55 calculates a chi-square value $\chi^2$ using a following expression (5). One of the x direction and the y direction is a first direction, and the other is a second direction. The tolerance margins in the x direction and the y direction indicate ranges of errors in estimated values from true values guaranteed by the image processing apparatus 20 for the user or a downstream system. When a measured value is 10 m in the x direction and a tolerance guaranteed by the image processing apparatus 20 is 10%, for example, a unilateral tolerance margin in the x direction is 1 m.

[Math. 6]
$$\chi^2 = \frac{d_1 \cdot d_2}{\lambda_1 \cdot \lambda_2} \quad (5)$$

In a right side of expression (5), a denominator corresponds to a product of a major axis and a minor axis of an error ellipse indicating a range of a standard deviation σ of error distribution. A value of $\chi^2$ calculated from expression (5) corresponds to a ratio of the area of a tolerance circle to the area of the error ellipse. The second index calculation section 55 calculates the second index by applying $\chi^2$ calculated in expression (5) to expression (4). A second index can also be called an object detection index.

Figure 9:
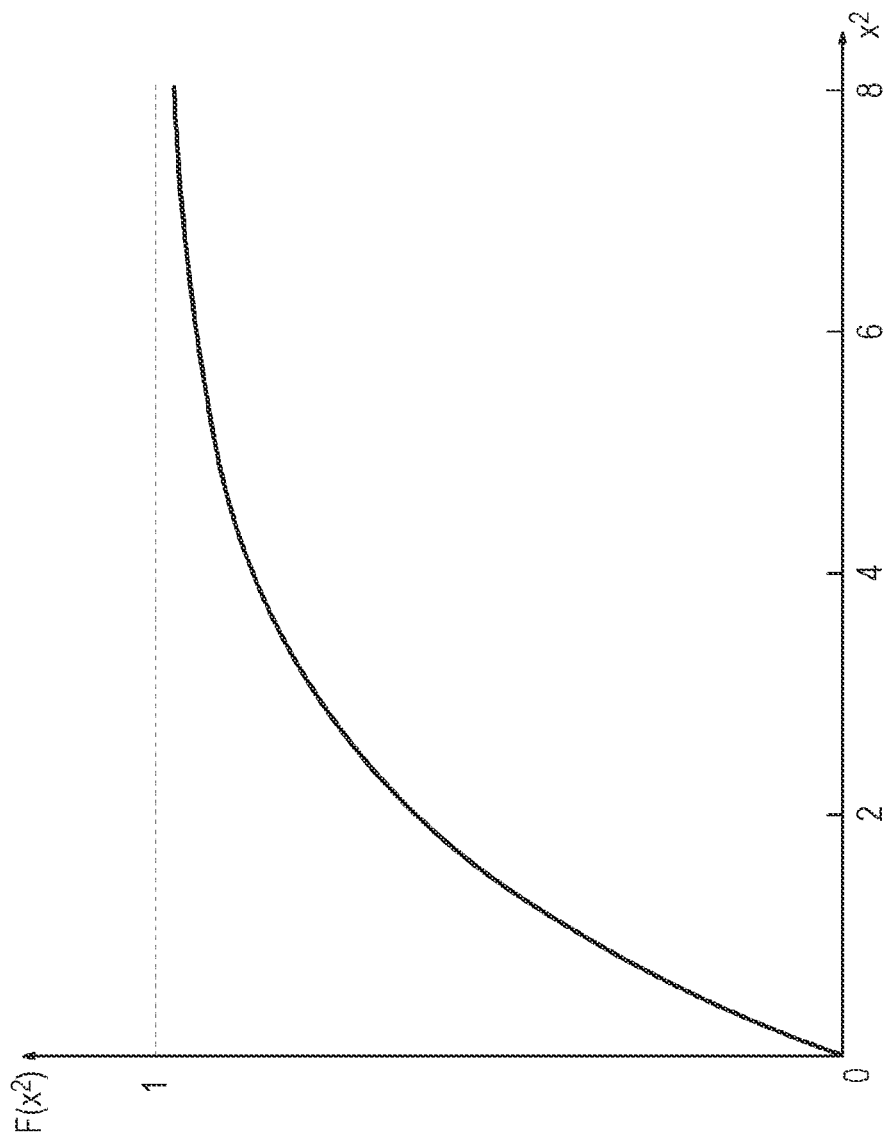
FIG. 9 is a diagram illustrating a cumulative distribution function in a method for calculating a second index.

As known in statistics, a cumulative distribution function with two degrees of freedom is represented by a graph of FIG. 9. Here, a horizontal axis represents $\chi^2$. A vertical axis represents cumulative distribution and corresponds to the second index. When the value of $\chi^2$ is small and close to 0, the error ellipse becomes large, and the second index becomes close to 0. In this case, it can be determined that a degree of reliability of estimation of a position is low. When the value of $\chi^2$ is large and close to infinity, the error ellipse becomes small, and the second index becomes close to 1. In this case, it can be determined that a degree of reliability of estimation of a position is high. The second index takes a value of 0 to 1.

The second index calculation section 55 outputs the second index to the integrated index calculation section 56. The second index is not limited to an index relating to a position of an object. The second index may include indices of degrees of reliability of a distance to a subject 40 and a size of the subject 40. The number of second indices is not limited to one, and may be two or more.

(Integrated Index Calculation Section)

The integrated index calculation section 56 calculates an integrated index, which is obtained by integrating together a plurality of individual indices including a first index calculated by the first index calculation section 54 and/or a second index calculated by the second index calculation section 55. The integrated index is also called an object detection index. Each individual index takes a value of 0 to 1. When a plurality of individual indices are n individual indices $a_i$ (i is a natural number of 1 to n), the integrated index calculation section 56 calculates an integrated index $a_{total}$ in accordance with a following expression (6). The integrated index $a_{total}$ takes a value of 0 to 1.

[Math. 7]

$$a_{total} = \frac{\sqrt{\sum_{i=1}^{n} a_i^2}}{\sqrt{n}} \quad (6)$$

The integrated index $a_{total}$ can be calculated while weighting the individual indices $a_i$, instead of using expression (6). For example, the integrated index $a_{total}$ may be calculated using expression (7).

[Math. 8]

$$a_{total} = \frac{\sqrt{\sum_{i=1}^{n} w_i a_i^2}}{\sqrt{\sum_{i=1}^{n} w_i}} \quad (7)$$

In expression (7), $w_i$ denotes weights for the individual indices $a_i$.

The integrated index calculation section 56 can output the calculated integrated index $a_{total}$ to the outside of the image processing apparatus 20, such as the determination apparatus 30, through the output interface 23. The control unit 22 may output the integrated index $a_{total}$ along with identification information regarding a subject image 42 detected by the image recognition section 51, such as a type, a color, and luminance, and corrected measurement information regarding a subject 40 calculated by the measurement information correction section 53, such as a position, a distance, and a size. The integrated index calculation section 56 can output a single integrated index $a_{total}$ for each subject image 42 recognized by the image recognition section 51.

(Processing Flow of Image Processing Apparatus)

Next, a method for processing an image according to an embodiment of the present disclosure will be described with reference to a flowchart of FIG. 10. The method for processing an image is an example of a method for processing information. The image processing apparatus 20 may be configured to achieve processing that is performed by the control unit 22 and that will be described hereinafter by reading a program stored in a non-transitory computer-readable medium. The non-transitory computer readable medium may be a magnetic storage medium, an optical storage medium, a magneto-optical storage medium, or a semiconductor storage medium, but is not limited to these. The magnetic storage medium may be a magnetic disk, a hard disk, or a magnetic tape. The optical storage medium may be an optical disc such as a CD (compact disc), a DVD, or a Blu-ray (registered trademark) disc. The semiconductor storage medium may be a ROM (read-only memory), an EEPROM (electrically erasable programmable read-only memory), a flash memory, or the like.

Figure 10:
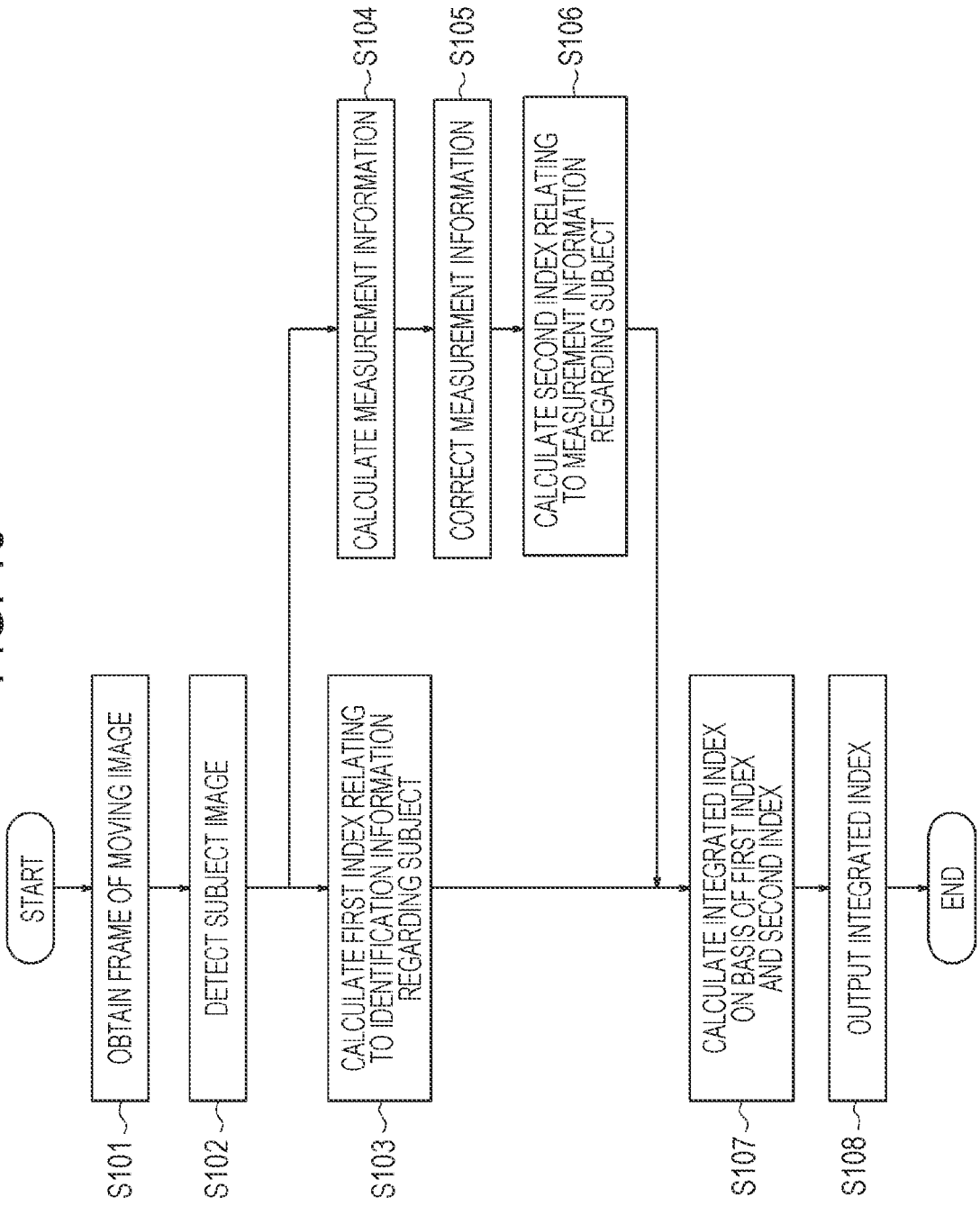
FIG. 10 is a flowchart illustrating an example of a process performed by the control unit of the image processing apparatus illustrated in FIG. 1.

The flowchart of FIG. 10 illustrates a process performed by the control unit 22 while the control unit 22 is obtaining sequential frames of a moving image. Each time the control unit 22 of the image processing apparatus 20 obtains a frame of a moving image, the control unit 22 performs processing in steps S101 to S108 in accordance with the flowchart of FIG. 10.

First, the control unit 22 obtains a frame of a moving image from the imaging apparatus 10 through the input interface 21 (step S101).

After obtaining a frame of a moving image in step S101, the control unit 22 detects a subject image 42 in an image of the frame using the image recognition section 51 (step S102). The control unit 22 calculates classifications of identification information regarding a subject 40 and belonging probabilities of the classifications along with the detected subject image 42. The control unit 22 also calculates information such as a position and a size of the subject image 42 in an image space 41.

The control unit 22 calculates, using the first index calculation section 54, a first index indicating a degree of reliability of the identification information on the basis of the belonging probability of each of the classifications of the identification information calculated in step S102 (step S103). The first index takes a value of 0 to 1.

The control unit 22 performs steps S104 to S106 in parallel with, or before or after, step S103.

The control unit 22 calculates, using the measurement information calculation section 52, measurement information such as a position, a distance, a size, and the like of the subject 40 in real space on the basis of the information such as the position and the size of the subject image 42 in the image space 41 calculated in step S102 (step S104).

The control unit 22 corrects, using the measurement information correction section 53, the measurement information calculated by the measurement information calculation section 52 (step S105). The control unit 22 estimates correct measurement information using estimated values of measurement information in past frames and the measurement information calculated in step S104. The control unit 22 calculates distribution of errors along with estimated values of measurement information. The distribution of errors is calculated as an error covariance matrix.

The control unit 22 calculates, using the second index calculation section 55, a second index indicating a degree of reliability of the measurement information using eigenvalues of the error covariance matrix calculated in step S105 (step S106). The second index takes a value of 0 to 1.

The control unit 22 calculates, using the integrated index calculation section 56, an integrated index, which is obtained by integrating together the first index and the second index calculated in steps S103 and S106, respectively, on the basis of the first index and the second index (step S107). The integrated index takes a value of 0 to 1.

The control unit 22 outputs the integrated index calculated in step S107 to the outside (step S108). The control unit 22 may also output the identification information regarding the subject image 42 detected in step S102 and the measurement information regarding the subject 40 corrected in step S105 along with the integrated index.

As described above, with the image processing apparatus 20 according to the present embodiment, the control unit 22 can calculate, by integrating information regarding a plurality of degrees of reliability together, a single index of a degree of reliability for one subject 40 to be detected. As a result, the control unit 22 can output a single integrated index for each of subjects 40 recognized as subject images 42 through image recognition.

In addition, since whether information detected for each subject 40 can be trusted can be indicated by a single index, the determination apparatus 30, which is located downstream of the image processing apparatus 20, can easily determine how much an output of the image processing apparatus 20 can be trusted. It is assumed, for example, that the determination apparatus 30 is incorporated into a system such as a collision avoidance or vehicle distance warning device of the vehicle 100 and the determination apparatus 30 has obtained integrated indices calculated by a plurality of image processing apparatuses 20. The determination apparatus 30 can perform processing according to degrees of reliability in accordance with values of the plurality of integrated indices output from the plurality of image processing apparatuses 20. If there are differences between information from the plurality of image processing apparatuses 20 and a value of an integrated index output from one of the image processing apparatus 20 is closer to 1, the determination apparatus 30 can trust and preferentially use information from the image processing apparatus 20.

The first index in the present embodiment is calculated using expression (1) on the basis of a belonging probability of each of a plurality of classifications of identification information including the classifications. A degree of reliability of the identification information, therefore, can be calculated as a consistent index of 0 to 1 through simple calculation.

The second index in the present embodiment is calculated using expression (4) or (5) on the basis of an error covariance matrix of measurement information and tolerances guaranteed by the image processing apparatus 20. As a result, a degree of reliability of measurement information can be calculated as a consistent index of 0 to 1 through simple calculation.

Since the image processing apparatus 20 in the present disclosure expresses all the indices of degrees of reliability, namely the first index, the second index, and the integrated index, as values of 0 to 1, the indices of degrees of reliability can be consistently handled. Even when the number of indices of degrees of reliability to be taken into consideration increases, for example, the indices can be integrated together as a single index using expression (6) or (7).

(Imaging Apparatus that Calculates Index of Degree of Reliability)

Figure 11:
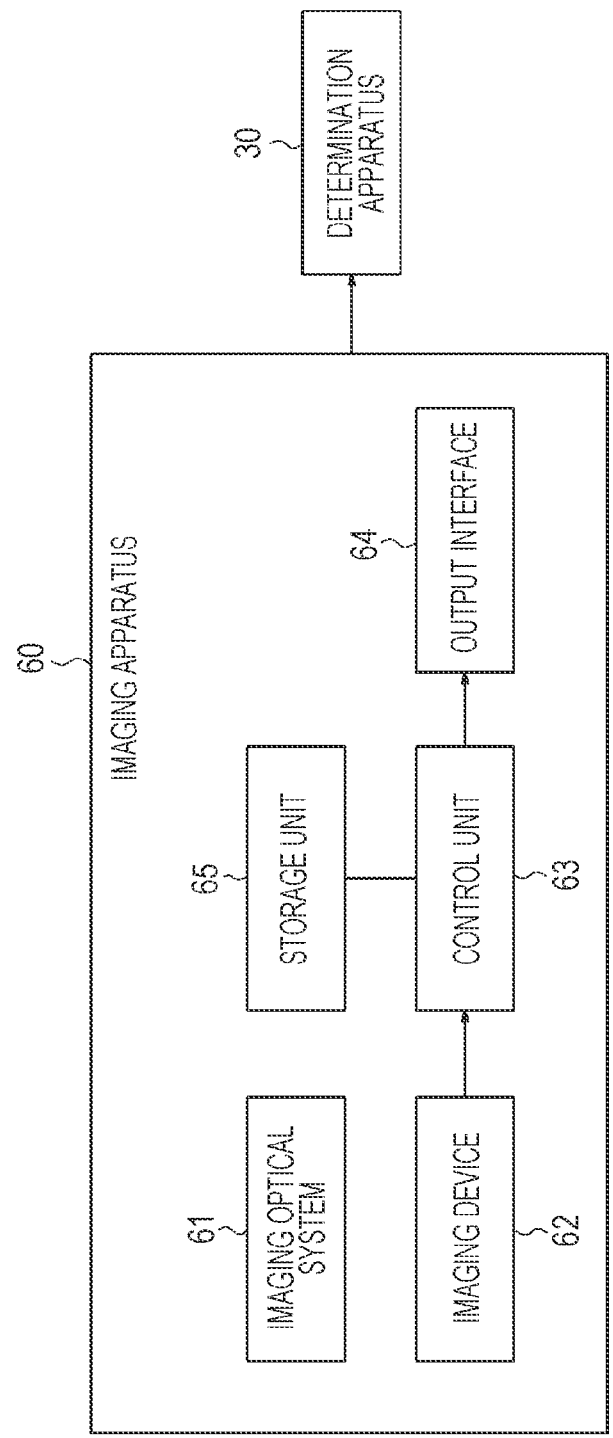
FIG. 11 is a block diagram illustrating a schematic configuration of an imaging apparatus, which is a sensing apparatus according to the embodiment.

The functions of the image processing apparatus 20 in the present disclosure described in the above embodiment can be incorporated into an imaging apparatus. FIG. 11 is a diagram illustrating an outline of an imaging apparatus 60 according to an embodiment of the present disclosure having the functions of the image processing apparatus 20. The imaging apparatus 60 includes an imaging optical system 61, an imaging device 62, a control unit 63, an output interface 64, and a storage unit 65. The imaging optical system 61 and the imaging device 62 are components similar to the imaging optical system 11 and the imaging device 12, respectively, of the imaging apparatus 10 illustrated in FIG. 1. The output interface 64 and the storage unit 65 are components similar to the output interface 23 and the storage unit 24, respectively, of the image processing apparatus 20 illustrated in FIG. 1. The control unit 63 is a component that has both the functions of the control unit 13 of the imaging apparatus 10 and the functions of the control unit 22 of the image processing apparatus 20 illustrated in FIG. 1.

The imaging apparatus 60 captures, using the imaging device 62, a moving image of a subject 40 formed by the imaging optical system 61. The control unit 63 performs a process that is the same as or similar to that illustrated in the flowchart of FIG. 10 on a moving image output from the imaging device 62. As a result, the imaging apparatus 60 can calculate identification information and measurement information regarding a subject image 42 and then calculate an integrated index indicating a degree of reliability of these pieces of information. The calculated integrated index is output to the outside of the imaging apparatus 60 through the output interface 64. As a result, effects similar to those produced by the image processing apparatus 20 of the image processing system 1 illustrated in FIG. 1 can be produced.

In the description of the above embodiment, the information processing apparatus is the image processing apparatus 20, and the sensor is the imaging apparatus 10. The sensor is not limited to an imaging apparatus that detects visible light, and may be a far-infrared camera that obtains an image based on far-infrared radiation, instead. In addition, the information processing apparatus in the present disclosure is not limited to one that obtains a moving image as observed data and that detects a detection target through image recognition. For example, the sensor may be one, other than an imaging apparatus, capable of sensing an observation space, which is an observation target, and detecting a direction and a size of a detection target, instead. The sensor may be, for example, one that employs electromagnetic waves or ultrasonic waves. The sensor that employs electromagnetic waves may be a millimeter-wave radar or a LiDAR (laser imaging detection and ranging). A detection target, therefore, is not limited to a subject whose image is captured. The information processing apparatus may detect a detection target by obtaining observation data including information such as a direction and a size of the detection target output from the sensor. In addition, the display space is not limited to an image space for displaying a moving image, and may be any space capable of displaying a detected detection target in two dimensions.

(Sensing Apparatus Including Millimeter-Wave Radar)

Figure 12:
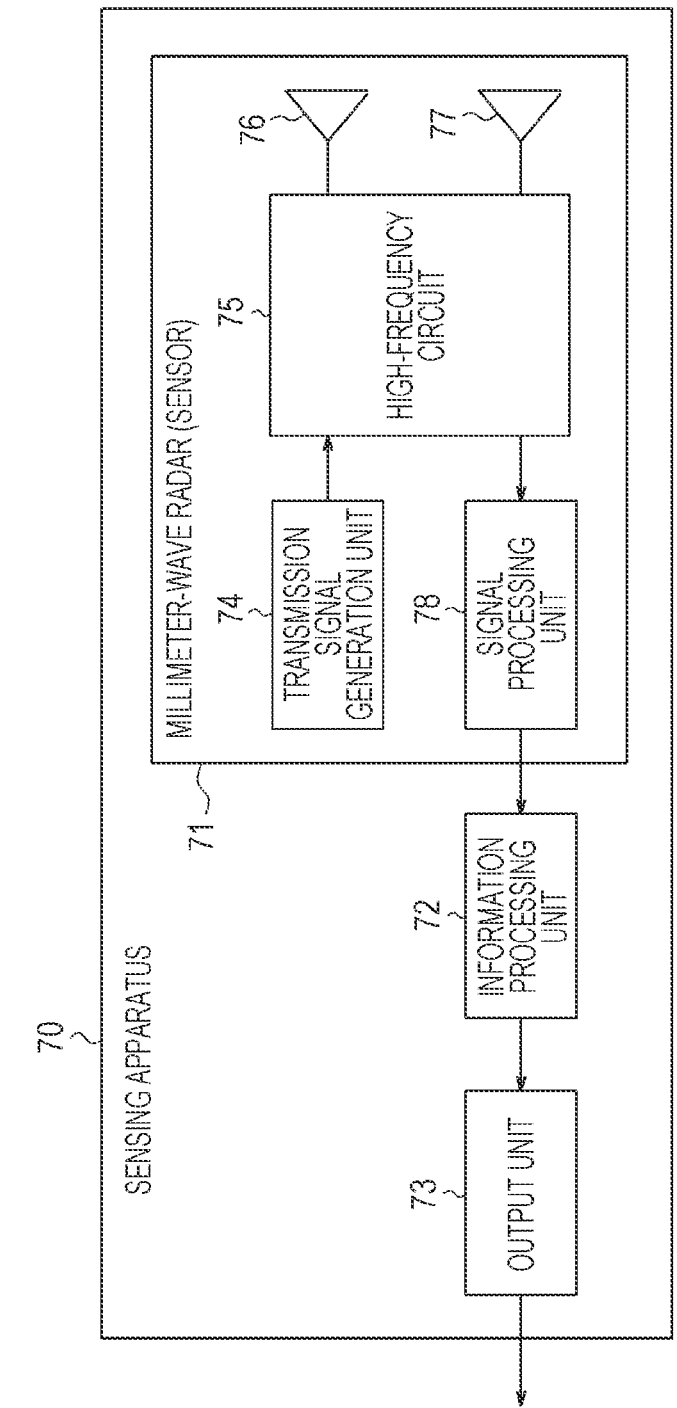
FIG. 12 is a block diagram illustrating an example of a schematic configuration of a sensing apparatus including a millimeter-wave radar.

As an example, a sensing apparatus 70 according to an embodiment will be described with reference to FIG. 12. The sensing apparatus 70 includes a millimeter-wave radar 71, which is an example of the sensor, an information processing unit 72, and an output unit 73. As with the imaging apparatus 10, the sensing apparatus 70 may be mounted on the vehicle at one of various positions.

The millimeter-wave radar 71 can detect a distance, a velocity, a direction, and the like of a detection target using electromagnetic waves in a millimeter-wave band. The millimeter-wave radar 71 includes a transmission signal generation unit 74, a high-frequency circuit 75, a transmission antenna 76, a reception antenna 77, and a signal processing unit 78.

The transmission signal generation unit 74 generates frequency-modulated chirp signals. In chirp signals, frequency increases or decreases at certain time intervals. The transmission signal generation unit 74 is achieved by, for example, a DSP (digital signal processor). The transmission signal generation unit 74 may be controlled by the information processing unit 72.

A chirp signal is subjected to D/A conversion and then subjected to frequency conversion in the high-frequency circuit 75 to become a high-frequency signal. The high-frequency circuit 75 radiates the high-frequency signal toward an observation space as radio waves using the transmission antenna 76. The high-frequency circuit 75 can receive reflected waves, which are the radio waves radiated from the transmission antenna 76 and reflected from a detection target, as a reception signal using the reception antenna 77. The millimeter-wave radar 71 may include a plurality of reception antennas 77, instead. The millimeter-wave radar 71 can estimate a direction of a detection target by detecting phase differences between the reception antennas using the signal processing unit 78. A method for detecting a direction used by the millimeter-wave radar 71 is not limited to one employing phase differences. The millimeter-wave radar 71 may detect a direction of a detection target through scanning with a millimeter-wave beam, instead.

The high-frequency circuit 75 amplifies a reception signal and converts the reception signal into a beat signal indicating frequency differences by mixing a transmission signal with the reception signal. The beat signal is converted into a digital signal and output to the signal processing unit 78. The signal processing unit 78 processes the reception signal and performs a process for estimating a distance, a velocity, a direction, and the like. Because a method for estimating a distance, a velocity, a direction, and the like used by the millimeter-wave radar 71 is known, description of processing performed by the signal processing unit 78 is omitted. The signal processing unit 78 is achieved by, for example, a DSP. The signal processing unit 78 may be achieved by the same DSP as the transmission signal generation unit 74.

The signal processing unit 78 outputs information regarding an estimated distance, an estimated velocity, and an estimated direction to the information processing unit 72 as observation data regarding a detection target. The information processing unit 72 can map the detection target to a virtual space on the basis of the observation data and perform various types of processing. As with the control unit 13 of the imaging apparatus 10, the information processing unit 72 is achieved by one or more processors. The information processing unit 72 may control the entirety of the sensing apparatus 70. The processing performed by the information processing unit 72 will be described later in more detail.

The output unit 73 is an output interface that outputs a result of processing performed by the information processing unit 72 to a display apparatus outside the sensing apparatus 70 or an ECU in the vehicle. The output unit 73 may include a communication processing circuit connected to a vehicle network such as a CAN, a communication connector, and the like.

Figure 13:
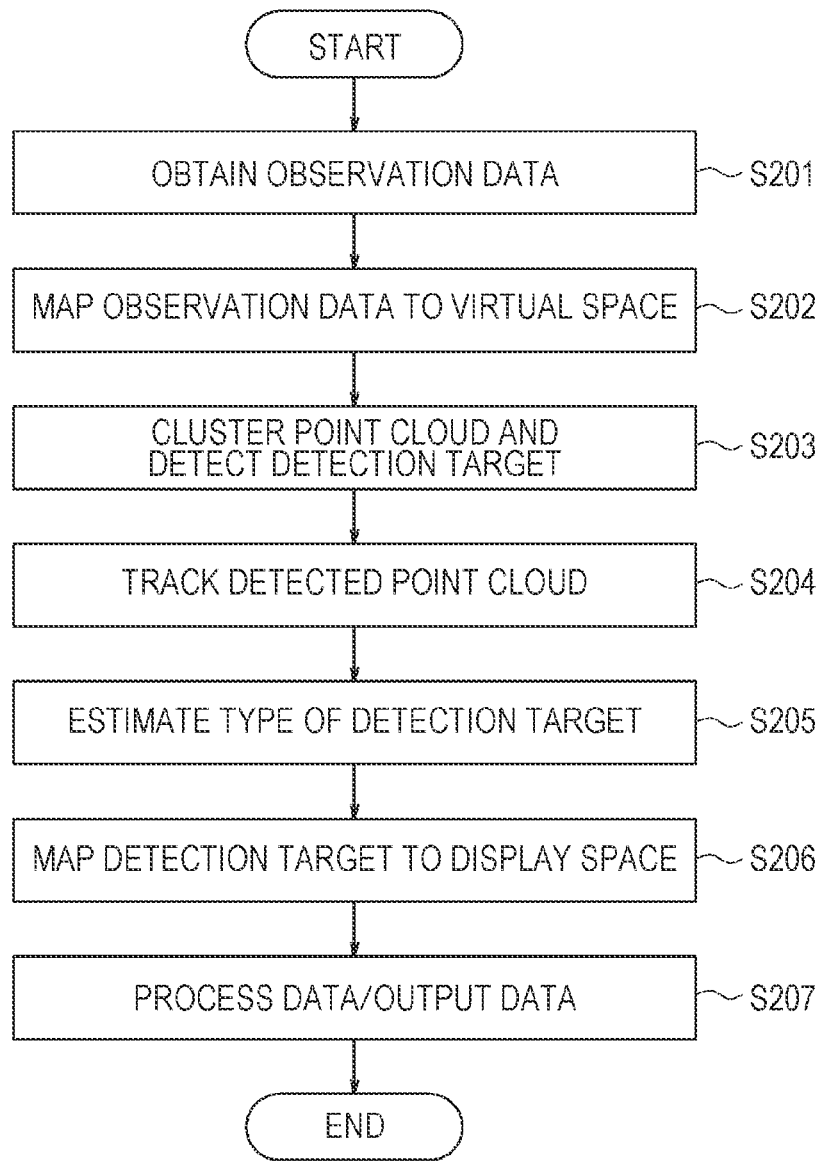
FIG. 13 is a flowchart illustrating an example of a process performed by an information processing unit of the sensing apparatus illustrated in FIG. 12.

A part of the processing performed by the information processing unit 72 will be described hereinafter with reference to a flowchart of FIG. 13.

The information processing unit 72 obtains observation data from the signal processing unit 78 (step S201).

Figure 14:
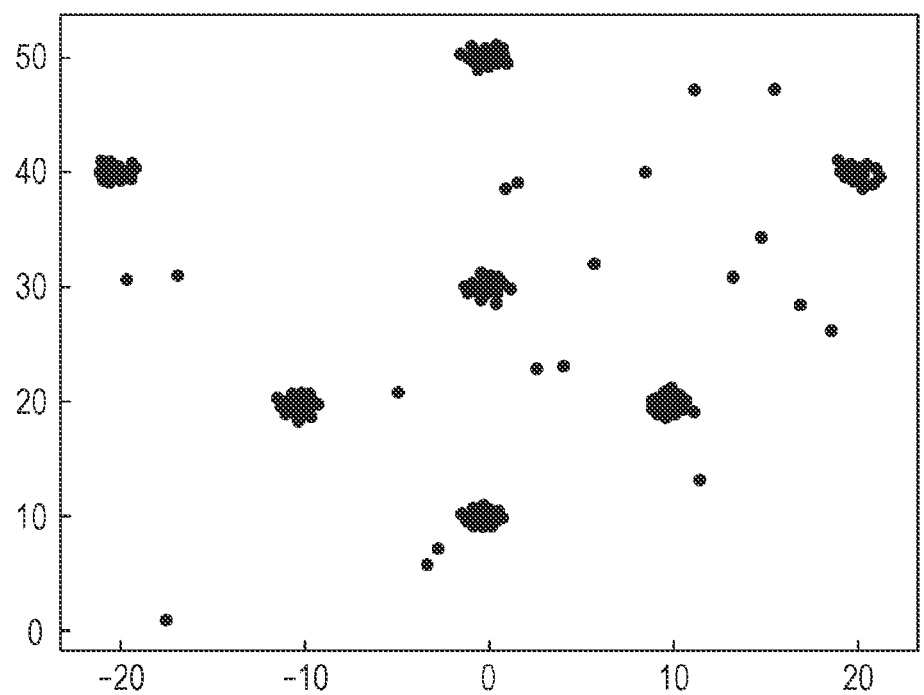
FIG. 14 is a diagram illustrating an example of observation data mapped to a virtual space.

Next, the information processing unit 72 maps the observation data to a virtual space (step S202). FIG. 14 illustrates an example of the observation data mapped to the virtual space. The millimeter-wave radar 71 obtains observation data as information regarding points, each of which includes information regarding a distance, a velocity, and a direction. The information processing unit 72 maps the observation data to a horizontal plane. In FIG. 14, a horizontal axis represents an x-axis direction, which is a lateral direction, in meters with a center thereof defined as 0. A vertical axis represents distance in a depth direction, which is a y-axis direction, in meters with a closest position defined as 0.

Figure 15:
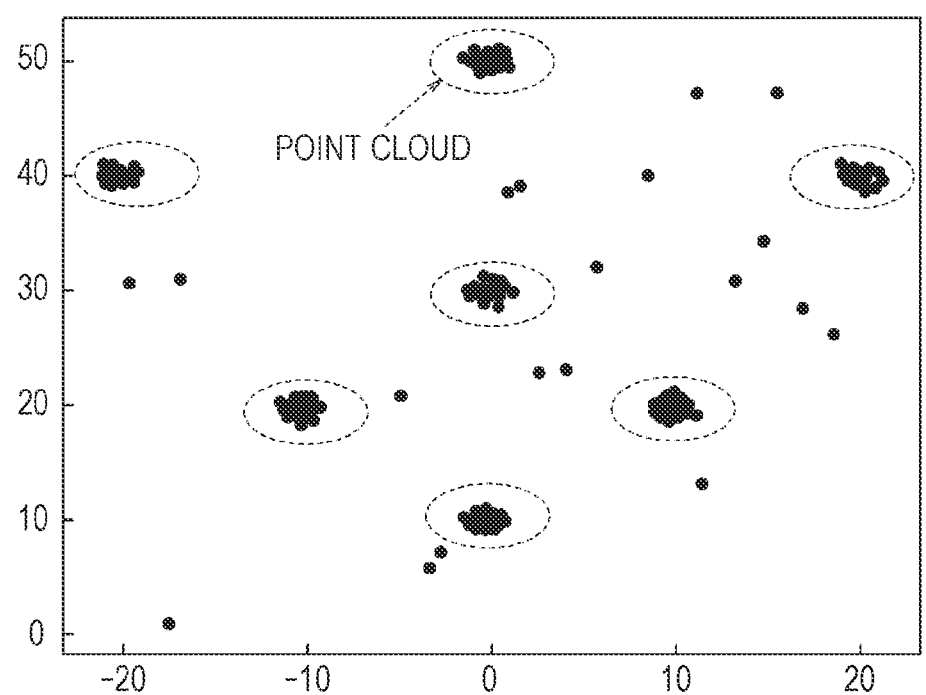
FIG. 15 is a diagram illustrating the observation data illustrated in FIG. 14 subjected to clustering.

Next, the information processing unit 72 clusters each of sets of points in the virtual space and detects a detection target (step S203). The clustering refers to extraction of point clouds, which are sets of points, from data indicating separate points. As indicated by broken-line ellipses in FIG. 15, the information processing unit 72 can extract point clouds, which are sets of points indicating observation data. The information processing unit 72 can determine that a detection target actually exists in a part including a large number of pieces of observation data. The information processing unit 72 can also determine, on the other hand, that observation data corresponding to discrete points is observation noise. The information processing unit 72 may determine whether a set of observation data is a detection target while providing a threshold for the number or density of points corresponding to observation data. The information processing unit 72 can estimate a size of a detection target on the basis of a size of an area occupied by a point cloud.

Next, the information processing unit 72 tracks a position of each of the detected point clouds in the virtual space (step S204). The information processing unit 72 may determine a center of an area occupied by each of the point clouds or an average of coordinates of positions of points included in each of the point clouds as the position of the point cloud. The information processing unit 72 tracks movement of each of the point clouds to detect movement of a detection target in time series. Each time the information processing unit 72 obtains a position of a point cloud in the virtual space, the information processing unit 72 estimates a correct position of a detection target at that time. In the estimation of a position of a detection target, the information processing unit 72 may calculate estimated values of the position and an error covariance matrix as with the measurement information correction section 53 illustrated in FIG. 3.

After step S204, or in parallel with step S204, the information processing unit 72 estimates a type of detection target corresponding to each of the point clouds (step S205). of detection target may be "vehicle", "pedestrian", "two-wheeled vehicle", or the like. A type of detection target can be identified using at least one of a velocity, a size, a shape, and a position of the detection target, density of points in observation data, intensity of a detected reflected wave, and the like. For example, the information processing unit 72 can accumulate, in time series, Doppler velocity of a detection target obtained from the signal processing unit 78 and estimate a type of detection target from a pattern of distribution of the Doppler velocity. In addition, the information processing unit 72 can estimate a type of detection target from information regarding the size of the detection target estimated in step S203. Furthermore, the information processing unit 72 can estimate a type of detection target by obtaining intensity of a reflected wave corresponding to observation data from the signal processing unit 78. Because a vehicle, which contains a lot of metal, has a large radar cross-section, for example, intensity of reflected waves is higher than that of a pedestrian, whose radar cross-section is small. The information processing unit 72 may calculate a degree of reliability indicating a probability of estimation along with the type of detection target.

After step S205, the information processing unit 72 maps the detection target from the virtual space to a display space, which is a space for display (step S206). The display space may be a three-dimensional observation space viewed from the user represented in a two-dimensional plane like an image space. The display space may be a two-dimensional space at a time when an observation target is viewed from the z-axis direction (vertical direction). The information processing unit 72 may directly map the observation data obtained from the signal processing unit 78 in step S201 to the display space, instead, without performing steps S203 to S205.

The information processing unit 72 can perform additional data processing on the basis of the detection target mapped to the display space and data obtained in steps S203 to S206, such as the position, velocity, size, and type of detection target (step S207). For example, the information processing unit 72 may perform processing similar to that performed by the first index calculation section 54 illustrated in FIG. 3 while using the type of detection target estimated in step S205 as identification information indicating a type of detection target and the degree of reliability as a belonging probability of each of classification. In addition, the information processing unit 72 may perform processing similar to that performed by the second index calculation section 55 illustrated in FIG. 3 using an error covariance matrix while using information such as the position and the size of the detection target estimated in steps S203 and S204 as measurement information. The information processing unit 72, therefore, can perform a process similar to that illustrated in FIG. 10 using observation data obtained by the millimeter-wave radar 71. The information processing unit 72 can also output the data from the output unit 73 for processing to be performed by other apparatuses (step S207).

As described above, when the millimeter-wave radar 71 is used as a sensor, too, the sensing apparatus 70 can produce similar effects by performing processing similar to that performed when an imaging apparatus is used as the sensor. The sensing apparatus 70 illustrated in FIG. 12 includes the millimeter-wave radar 71 and the information processing unit 72. The millimeter-wave radar and an information processing apparatus having the function of the information processing unit 72, however, may be separately provided, instead.

Although an embodiment of the present disclosure has been described on the basis of the drawings and the examples, it should be noted that those skilled in the art can easily modify or correct the embodiment in various ways on the basis of the present disclosure. It should therefore be noted that the scope of the present disclosure includes such modifications and corrections. For example, the functions or the like included in some components or steps can be rearranged insofar as no logical contradiction is caused. A plurality of components or steps may be combined together or divided. Although the apparatus has been mainly described in the embodiment of the present disclosure, an embodiment of the present disclosure can also be implemented as a method including the steps performed by the components of the apparatus. An embodiment of the present disclosure can also be implemented as a method executed by a processor included in an apparatus, a program, or a storage medium storing the program. It should be understood that the scope of the present disclosure also includes these.

A "mobile object" in the present disclosure may be a vehicle, a ship, or an aircraft. A "vehicle" in the present disclosure may be an automobile or an industrial vehicle, but is not limited to these and may be a railroad vehicle, a vehicle for daily living, or a fixed-wing aircraft that runs on a runway. An automobile may be a passenger vehicle, a truck, a bus, a two-wheeled vehicle, a trolleybus, or the like, but is not limited to these and may be another vehicle that runs on a road. An industrial vehicle may be an industrial vehicle for agricultural or construction purposes. An industrial vehicle may be a forklift or a golf cart, but is not limited to these. A vehicle for agricultural purposes may be tractor, a cultivator, a transplanter, a binder, a combine, or a lawn mower, but is not limited to these. An industrial vehicle for construction purposes may be a bulldozer, a scraper, an excavator, a crane, a dump truck, or a road roller, but is not limited to these. A vehicle may be one powered by a human, instead. Classifications of vehicles are not limited to above. For example, an automobile may be an industrial vehicle that can run on a road, and a plurality of classifications may include the same vehicle. A ship in the present disclosure may be a marine jet, a boat, or a tanker. An aircraft in the present disclosure may be a fixed-wing aircraft or a rotary-wing aircraft.

REFERENCE SIGNS LIST 1 image processing system (information processing system)
10 imaging apparatus (sensing apparatus)
11 imaging optical system
12 control unit
20 image processing apparatus (information processing apparatus)
21 input interface
22 control unit (processor)
23 output interface
24 storage unit
30 determination apparatus
40 subject (detection target)
41 image space
42, 42a, 42b subject image
43 representative point
44 reference plane
45 material point
46 virtual space
51 image recognition section
52 measurement information calculation section
53 measurement information correction section
54 first index calculation section
55 second index calculation section
56 integrated index calculation section
60 imaging apparatus (sensing apparatus)
61 imaging optical system
62 imaging device
63 control unit
64 output interface
70 sensing apparatus
71 millimeter-wave radar (sensor)
72 information processing unit
73 output unit
74 transmission signal generation unit
75 high-frequency circuit
76 transmission antenna
77 reception antenna
78 signal processing unit
100 vehicle (mobile object)
$v_1$, $v_2$ belonging probability vector

The invention claimed is:

1. An information processing system mounted on a mobile object comprising:
a sensor that obtains observation data from an observation space;
an information processing apparatus including a processor that detects a detection target from the observation data, calculates a plurality of individual indices indicating degrees of reliability, which include at least one individual index relating to measurement information regarding the detection target, and also calculates an integrated index, which is obtained by integrating the plurality of calculated individual indices together; and a determination apparatus included in a system of the mobile object that provides a function of at least one of collision warning, automatic braking, and automatic steering, the system of the mobile object including at least one of a collision avoidance device of the mobile object or a vehicle distance warning device of the mobile object, the determination apparatus including a processor configured to determine, on a basis of the integrated index, whether the measurement information based on the sensor is available, wherein the processor of the information processing apparatus calculates, from the observation data, a position of the detection target on a two-dimensional plane as the measurement information regarding the detection target along with an error covariance matrix and then calculates the individual index relating to the position on a basis of the error covariance matrix and estimated ranges of the detection target, eigenvalues of the error covariance matrix are denoted by $\lambda_1$ and $\lambda_2$, unilateral tolerance margins in a first direction and a second direction, which intersects with the first direction, of the two-dimensional plane allowable as the estimated ranges are denoted by $d_1$ and $d_2$, and the processor of the information processing apparatus uses $\chi^2$, which is calculated using:

$$\chi^2 = \frac{d_1 \cdot d_2}{\lambda_1 \cdot \lambda_2}$$

to calculate the individual index relating to the position using:

$$F(x) = 1 - e^{-\frac{x}{2}}.$$

2. The information processing system according to claim 1, further comprising:
   a plurality of the sensors; and
   a plurality of the information processing apparatuses,
   wherein the determination apparatus determines, on a basis of a plurality of the integrated indices calculated by the plurality of information processing apparatuses, which of a plurality of pieces of information obtained by the plurality of sensors is to be preferentially used.

3. The information processing system according to claim 1, wherein the determination apparatus does not use the measurement information regarding the detection target for the at least one of the collision warning, the automatic braking, and the automatic steering when the integrated index is lower than a predetermined value.

4. The information processing system according to claim 1, wherein the plurality of individual indices and the integrated index each have a value of 0 to 1.

5. The information processing system according to claim 1, wherein the plurality of individual indices are n individual indices $a_i$ (i is a natural number of 1 to n), and the processor of the information processing apparatus calculates the integrated index using:

$$a_{total} = \frac{\sqrt{\sum_{i=1}^{n} a_i^2}}{\sqrt{n}}.$$

6. The information processing system according to claim 1, wherein the plurality of individual indices are n individual indices $a_i$ (i is a natural number of 1 to n), and the processor of the information processing apparatus calculates the integrated index using:

$$a_{total} = \frac{\sqrt{\sum_{i=1}^{n} w_i a_i^2}}{\sqrt{\sum_{i=1}^{n} w_i}}$$

where $w_i$ is a weight for each of the indices.

7. The information processing system according to claim 1, wherein the measurement information is quantitative information and further includes information regarding at least a distance, or a size of the detection target.

8. An information processing system mounted on a mobile object, comprising:
   a sensor that obtains observation data from an observation space;
   an information processing apparatus including a processor that detects a detection target from the observation data, calculates a plurality of individual indices indicating degrees of reliability, which include at least one individual index relating to identification information regarding the detection target, and also calculates an integrated index, which is obtained by integrating the plurality of calculated individual indices together; and
   a determination apparatus included in a system of the mobile object that provides a function of at least one of collision warning, automatic braking, and automatic steering, the system of the mobile object including at least one of a collision avoidance device of the mobile object or a vehicle distance warning device of the mobile object, the determination apparatus including a processor configured to determine, on a basis of the integrated index, whether the identification information based on the sensor is available,
   wherein the processor of the information processing apparatus calculates the individual index relating to the identification information using:

$$\frac{\|v_p\|_2 - 1/\sqrt{N}}{1 - 1/\sqrt{N}}$$

where the identification information is information identified from one of a plurality of classifications, a vector whose element is the belonging probability of each of the classifications is a belonging probability vector $v_p$ and a number of classifications is N.

9. The information processing system according to claim 8, wherein the identification information includes at least a type, a color, or luminance of the detection target.

10. The information processing system according to claim 8,
wherein the processor of the information processing apparatus calculates, from the observation data, classifications of the type, the color, or the luminance to which the detection target can belong along with belonging probabilities of the classifications and then calculates the individual index relating to the identification information on a basis of the belonging probabilities.

11. A mobile object comprising the information processing system according to claim 8.

* * * * *